United States Patent [19]

Gere

[11] Patent Number: 5,155,589
[45] Date of Patent: Oct. 13, 1992

[54] STORAGE AND RETRIEVAL OF IMAGES FROM A GREY IMAGE HAVING ARTIFICIALLY ENHANCED COLOR REGIONS

[76] Inventor: David S. Gere, 2191 Avy Ave., Menlo Park, Calif. 94025

[21] Appl. No.: 687,678

[22] Filed: Apr. 19, 1991

Related U.S. Application Data

[63] Continuation-in-part of Ser. No. 7/527,007, May 22, 1990, abandoned.

[51] Int. Cl.⁵ .............................................. H04N 1/46
[52] U.S. Cl. ..................................... 358/81; 358/455; 358/80
[58] Field of Search ................................ 358/455–458, 358/75, 80, 81

[56] References Cited

U.S. PATENT DOCUMENTS

| | | | |
|---|---|---|---|
| 432,530 | 7/1890 | Ives . | |
| 747,961 | 12/1903 | Frauenfelder . | |
| 755,983 | 3/1904 | Wood . | |
| 817,569 | 4/1906 | Ives . | |
| 2,736,762 | 2/1956 | Kell | 178/5.4 |
| 3,378,633 | 4/1968 | Macovski | 178/5.4 |
| 3,378,634 | 4/1968 | Macovski | 178/5.4 |
| 3,459,885 | 8/1969 | Goldmark et al. | 178/5.4 |
| 3,495,518 | 2/1970 | Takagi et al. | 95/12.21 |
| 3,522,371 | 7/1970 | Goldmark | 178/5.4 |
| 3,586,434 | 6/1971 | Mueller | 355/2 |
| 3,614,302 | 10/1971 | Goldberg | 178/5.2 R |
| 3,637,925 | 1/1972 | Flory et al. | 178/5.4 ST |
| 3,647,943 | 3/1972 | Marshall | 178/5.4 ST |
| 3,714,875 | 2/1973 | Yost, Jr. | 95/12.2 |
| 3,715,461 | 2/1973 | Hanlon | 178/5.2 R |
| 3,728,477 | 4/1973 | Kubota | 178/5.4 CD |
| 3,763,312 | 10/1973 | Yoneyama | 178/5.4 |
| 3,820,992 | 6/1974 | Bestenreiner et al. | 96/27 E |
| 3,869,705 | 3/1975 | Woywood et al. | 358/5 |
| 4,689,696 | 8/1987 | Plummer | 358/333 |
| 4,690,150 | 9/1987 | Mayo, Jr. . | |
| 4,755,870 | 7/1988 | Markle et al. | 358/81 |
| 4,829,371 | 5/1989 | Hiramatsu et al. | 358/80 |
| 4,878,116 | 10/1989 | Thomas et al. | 358/110 |
| 4,926,250 | 5/1990 | Konishi | 358/75 |
| 4,942,461 | 7/1990 | Abe et al. | 358/455 |
| 4,970,586 | 11/1990 | Sunda et al. | 358/457 |
| 4,984,072 | 1/1991 | Sandrew | 358/81 |
| 4,998,165 | 3/1991 | Lindstrom | 358/81 |
| 5,019,898 | 5/1991 | Chao et al. | 358/81 |

*Primary Examiner*—Stephen Brinich
*Attorney, Agent, or Firm*—Burns, Doane, Swecker & Mathis

[57] ABSTRACT

Methods and apparatus for decomposing a set of complementary color signals that form a color enhanced image into four or five color maps of an image, for storing said four or five color maps on a sheet of black and white film, and for reconstructing color images from the black and white film images. An image that has been color enhanced in selected regions with color added to depict a variable characteristic that is color independent so that changes in that chracteristic can be determined is decomposed into four or five color constituent maps. The decomposition is performed on an image that is presented electronically as three complementary color bytes, or analog equivalents thereof, for each pixel with the value encoded in each byte being the intensity of that complementary color at that pixel of the image. Also disclosed is the storing on black and white film the constituent parts of a composite color image having a plurality of parts, e.g. four or five colors. This is done by recording the pixel intensity value of each of the plurality of parts for each pixel location in the composite image as a plurality of separate images on a single sheet of black and white film. Finally, there is disclosed the capability to reconstruct a color image from the four or five constituent image portions recorded on black and white film by the selective illumination of each of those image portions and the focusing of the light that passes through those image portions. White light is used to illuminate the grey scale and black spot images and light having a color that corresponds to the color information of the corresponding one of the three complementary color iamges is used to illuminate the other portions of the film. The system provides a number of advantages, including providing an "enhanced grey scale" image, which can provide an advantageous diagnostic tool.

42 Claims, 8 Drawing Sheets

STORAGE AND RETRIEVAL OF IMAGES FROM A GREY IMAGE HAVING ARTIFICIALLY ENHANCED COLOR REGIONS

RELATED APPLICATION

This application is a continuation-in-part of U.S. application Ser. No. 07/527,007 filed May 22, 1990, now abandoned.

FIELD OF THE INVENTION

The present invention relates to the decomposition of a composite grey/color image, where the color is artificially added to enhance the depiction of a selected phenomena. The decomposition is done into four or five constituent parts. In the four part decomposition, these are the grey image portion where there was no color present and three complimentary color portions that when combined describe the color portions of the original image with each of the four constituent images stored as grey images on black and white film transparencies. The present invention also relates to the reconstructing of a color image from a novel set of constituent image parts with each of those parts being generally useful even when not reconstructed into an overall color image.

BACKGROUND OF THE INVENTION

In many areas it has been found to be advantageous to enhance a grey image with color in regions of the total image to display variable phenomena which is without natural color. For example, weather radar images are color enhanced to show cloud density since that is particularly related to storm intensity in thunder storms, and medical images generated by a variety of machines produce color enhanced images to depict such things as blood flow in organs that are imaged by ultrasound. Many other applications exist and would be of interest so that an easily readable, permanent record could be made for later study, such as the air traffic pattern in the vicinity of an airport at just prior to, and at the time of, a sudden, premature total loss of vertical separation between an aircraft and the earth. Such an image could be color enhanced to show the altitudes of the various aircraft in the region showing both horizontal and vertical separation between them.

In the medical arts it has been demonstrated that such color enhanced images improve the diagnostic capabilities from a single image, however, the methods and color media for storing these images leaves a lot to be desired as far as cost, speed at which they can be prepared and the resolution of the image.

Ultrasound images are typical of the medical applications for artificially color enhanced images in use today. The basic ultrasound image is a black and white, or grey scale, image that can be viewed on a monitor in real time or stored on film. To improve the diagnostic value of ultrasound images, many ultrasound machines include a color doppler option for adding, in the form of color enhancement, the location and velocity of blood flow at the instant that the image is recorded. When the color doppler option is in use, the image produced includes black and white regions where the doppler does not detect blood flow with a velocity that is above the minimum selected threshold level, and variable color regions where the doppler system detects blood flow at various velocities. For example, there are generally two velocity scales, one for blood flow toward the transducer and another for blood flow away from the transducer. Thus, red through yellow might be selected for blood flow in one direction and blue through green for blood flow in the other direction. In the final image, the color information is substituted for the black and white information where the flow rate of the blood exceeds the preselected threshold level.

At present, the media available for recording these color images are Polaroid instant color film, color thermal prints, and standard color film, such as Ektachrome from Kodak. All of these are expensive and lack the resolution of black and white x-ray film that radiologists have become familiar with and have come to depend upon. Neither of the hard copy media (color print film and color thermal prints) produce high quality diagnostic images from which the radiologist can discern subtle features of tissue structure important in diagnosing the pathology of the patient. For this reason, the color doppler feature of an ultrasound machine can be turned off to permit the recording of the grey scale image on more familiar x-ray film (black and white transparency). The x-ray film produces an image of very high quality, with high spatial resolution, wide dynamic range, and high contrast resolution. The cost of the x-ray film is also very low when compared to the color film; six images for about $1.00, whereas color film (either Polaroid or thermal print) costs about $6.00 for six images.

Standard color film presents several additional problems and, thus, has not been adopted by hospitals. In addition to the high cost of the film, it requires special processing, the film is subject to the color balance of the film shifting, and the processing time is long. The length of time to process the film alone would be a problem since the patient must be kept at the facility until the radiologist has had at least a chance to make an initial review of the images to determine whether the film was properly exposed and developed, etc.

As a result of the short comings of the presently available media for making hard copies of such color enhanced images there has developed a need for a fast, inexpensive, media that produces a high quality color image (high spatial resolution, wide dynamic range, high contrast resolution and stable color balance), and the method for producing and viewing such a storage media. The present invention meets all of these criteria.

SUMMARY OF THE INVENTION

In accordance with the illustrated embodiments, the present invention provides methods and apparatus for decomposing a set of complementary color signals that represent a color enhanced image into four or five color maps of an image, for storing said four or five color maps on a sheet of black and white film, and for reconstructing color images from the black and white film images.

In one embodiment there is disclosed a method and apparatus for decomposing a digital or analog image, that has been color enhanced in selected regions with color added to depict a variable characteristic that is color independent so that changes in that characteristic can be determined, into four constituent maps including a grey scale original image map of the regions where no color has been added and three complementary color maps of the color enhanced regions of the image. The decomposition is performed on an image that is presented electronically as three complementary color bytes for each pixel with the value encoded in each byte being the intensity of that complementary color at that pixel of the image. The decomposition is performed by examining the intensity values of each of the three complementary color bytes at the same pixel location of the image. If each of the examined intensity values of each of said three complementary color bytes are within a selected tolerance of being equal to each other, the pixel intensity value in the grey scale image map is set to substantially the intensity value of a selected one of the three complementary color bytes, and the pixel intensity value in each of the three complementary color maps are set to the zero intensity value. If each of the examined intensity values of each of said three complementary color bytes are not within a selected tolerance of being equal to each other, the pixel intensity value in the grey scale image map is set to the zero intensity value, and the pixel intensity value in each of the three complementary color maps is set to the corresponding one of the intensity values of the three complementary color bytes. This process is then repeated for each pixel location in the image.

A second embodiment that is similar to the first embodiment extends the four color decomposition to a five color decomposition: a grey scale original image map, a black spot image map, and three complementary color maps of the color enhanced regions of the image. That is accomplished by storing the grey scale bytes for the complete grey scale image (without color enhancement) in a pixel map, and examining the intensity values of each of the three complementary color bytes at the same pixel location of the composite image. If each of the examined intensity values of each of the three complementary color bytes are within a selected tolerance of being equal to each other, the pixel intensity value in the black spot image map is set to the maximum intensity value and the pixel intensity value in each of the three complementary color maps are set to the zero intensity value. If each of the examined intensity values of each of the three complementary color bytes are not within a selected tolerance of being equal to each other, the pixel intensity value in the black spot image map is set to the zero intensity value and the pixel intensity value in each of the three complementary color maps are set to the corresponding one of the intensity values of the three complementary color bytes. The pixel value that corresponds to the next pixel location in the composite image is processed by reading the associated grey scale value from the grey scale pixel map and the next pixel value from each of the other four maps. Then each of the above processes are repeated for each pixel location in the image.

A third embodiment is disclosed for storing on black and white film the constituent parts of a composite color image having a plurality of parts, e.g. four or five colors. This is done by recording the pixel intensity value of each of the plurality of parts for each pixel location in the composite image as a plurality of separate images on a single sheet of black and white film.

A fourth embodiment provides the capability to reconstruct a color image from the four constituent image portions recorded on black and white film wherein one image portion corresponds to a grey scale image with zero intensity pixels in those pixel locations where the composite image includes color information and three image portions each corresponding to one of three complementary color images each with zero intensity pixels in those pixel locations where the composite image is to be grey. This is accomplished by simultaneously illuminating the grey scale image portion of the black and white film with white light, and each of the three other image portions of the black and white film with light having a color that corresponds to the color information of the corresponding one of the three complementary color images, and then focusing the light passing through each of the four constituent image portions of the black and white film to the same point on a viewing screen to create a composite grey and color image.

The fifth embodiment of the present invention is similar to the fourth embodiment except that it is for selectively displaying either the grey scale images without color enhancement, or the reconstruction of the grey and color images from five constituent image portions recorded on black and white film wherein one image portion corresponds to a grey scale image without color enhancement, a black spot image with zero intensity pixels in those pixel locations where the composite image includes color information and maximum intensity pixels where the composite image does not include color information, and three image portions each corresponding to one of three complementary color images each with zero intensity pixels in those pixel locations where the black spot image includes maximum intensity pixels. This is done by first selecting for display either the grey scale image without color enhancement or the reconstructed color image. If said grey scale image without color enhancement is selected the grey scale image is illuminated with a white light, and the light passing through the grey scale image of the black and white film is focused to a point on a viewing screen, which provides the full grey scale image. If the black spot image is selected for illumination with the grey scale image, an enhanced or augmented grey scale image is produced. If the three complementary color image portions of the black and white film are selected for illumination, a full color image is produced without grey portions present. If the full grey scale image is selected for illumination with the three color image, a grey, color overlay image is produced. In the system of this invention, certain images need not be recorded if some viewing options are not desired or available. For example, the black spot image does not need to be recorded if the only viewing options are full grey scale or full grey scale with color overlay. Alternatively, if the reconstructed color image is selected, the grey scale and black spot images are illuminated in series with a white light to create a projected grey scale image with black spots where color is to be displayed in the composite image, each of the three complementary color image portions of the black and white film are each illuminated with light having a color that corresponds to the color information of the corresponding one of the three complementary color images, and the light passing through the combination of the grey scale and black spot images and each of the three complementary color image portions of said black and white film is focused to the same point on a viewing screen to create a composite grey and color image.

BRIEF DESCRIPTION OF THE FIGURES

FIG. 7 is a simplified, two dimensional, schematic representation of the present invention for the projection of an image from the "four color" black and white collective image shown in FIG. 5a.

FIG. 8 is a simplified, two dimensional, schematic representation of the present invention for the projection of an image from the "five color" black and white collective image shown in FIG. 6a.

DESCRIPTION OF THE PREFERRED EMBODIMENTS

Figures 1, 2:
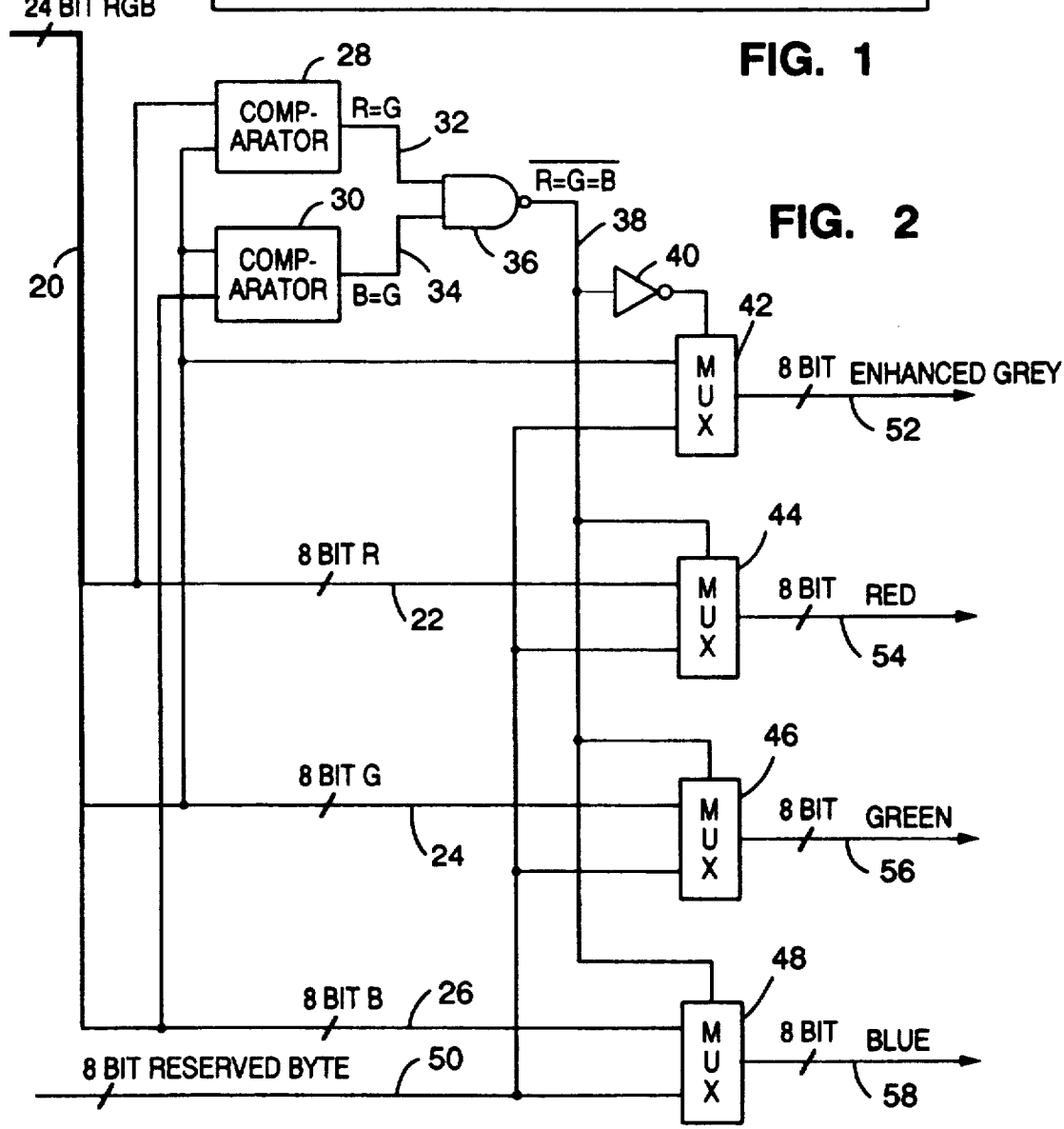
FIG. 1 is a representation of a color enhanced grey image upon which the present invention functions.
FIG. 2 is a block diagram of one embodiment of the present invention for the separation of the combined RGB (red-green-blue) pixels to create "four color" image maps: an enhanced grey scale image where no color information has been added to the image, and individual color components where color has been added.

FIG. 1 is a representation of the type of color enhanced grey image 10 that is to be stored on a media that produces a high quality color image with high spatial resolution, wide dynamic range, high contrast resolution and stable color balance. The image of FIG. 1 has a general grey field 12, and distinct red portions 14, green portions 16 and blue portions 18. In a real image, such as a sonogram or an ultrasound image, the colors will vary continuously from blue to red, however, that is accomplished by energizing, to various degrees, one or more of the primary color pixels at the same location in a bit map, on a monitor screen, on the surface of the color print film or on copy paper by color copy technique.

Film Storage Technique

As stated in the Background, the media that has previously been used for storing such a multi-color image lacks the ability to record the details that are possible on ordinary black and white film and more other serious drawbacks. The present invention provides a way to store the details of such an image and its enhanced color portions on standard black and white film, such as x-ray film, then project that image with its color enhancements as required by the professional who wishes to view that image in either its grey form or in its color enhanced form. The x-ray film images used in the medical arts today are either full sheet or multiple small format images recorded on black and white film. In the various formats in use, four, six, or nine, images are stored on a single sheet of film. The present invention requires four or five separate frames of color information to complete a single image, however, a single sheet of x-ray film will be able to store four complete images. This is possible since the details of the organ walls or edges of storm cells of a weather system need only be stored in the grey portion of the image, and the red, green, blue and black spot information can be recorded in a much smaller space without loss of the information that those "colors" provide for the various applications of the present invention when over laid on the grey image since less spatial resolution is necessary in those regions.

The constituent images recorded on the film do not need to all be the same size, they only need to be projected at proper magnification when reconstructed to produce the original color image. In general there is an advantage to recording the images with different sizes. Doing so allows the image component with the greatest requirement for spatial resolution to use more film area, and hence have higher resolution, than components with a lower requirement for spatial resolution. For color doppler ultrasound images, the requirement for spatial resolution is much higher in the grey scale image component than in the color image components. In order to use the film area most efficiently, it would be advantageous to record the grey component at a much larger size than the color components, for example, as much as 2-4 times as large. This has the added benefit of making direct viewing of the grey image easier.

As mentioned earlier, this method of separating the image into constituent parts, combined with recording the image on black and white film, allows the radiologist to diagnose pathology in most cases directly from the film without the need to reconstruct the full color image. This is because the tissue structure is apparent in the grey image component, and the degree of vascularization or stenosis can be inferred from the enhanced grey image which defines the color regions unambiguously. This advantage is not present with other methods of color image separation because the image information would be combined in an undesirable manner. For example, if the color image was recorded as red, green and blue components, with the grey image present in all three components, it would not be possible to tell from direct inspection of the component images if a bright spot were an abnormality in tissue structure or just the cross section of a blood vessel. This would make diagnosis of pathology very different without full color image reconstruction.

Figure 5A:
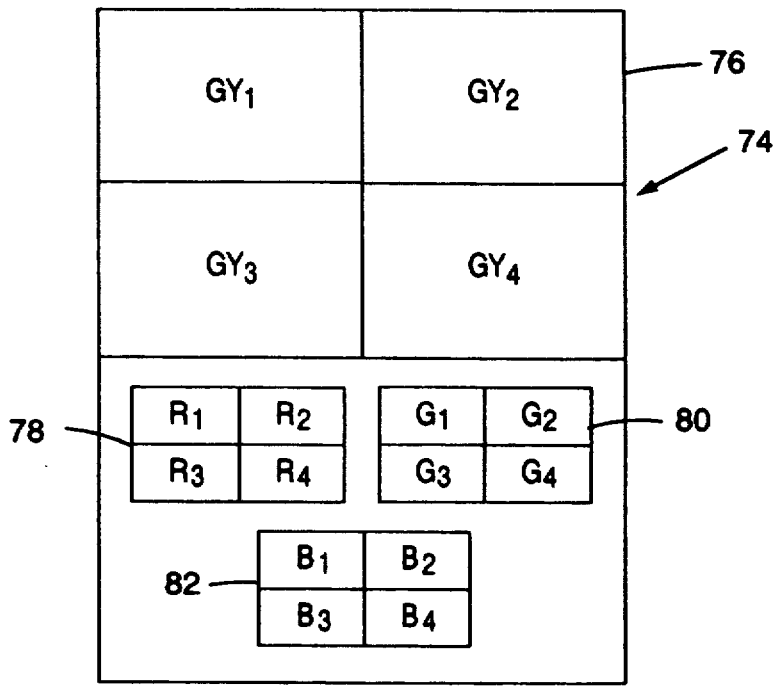
FIG. 5a is a two dimensional layout diagram of the "four color" components of four separate images to be recorded on a sheet of black and white film.
Figure 6A:
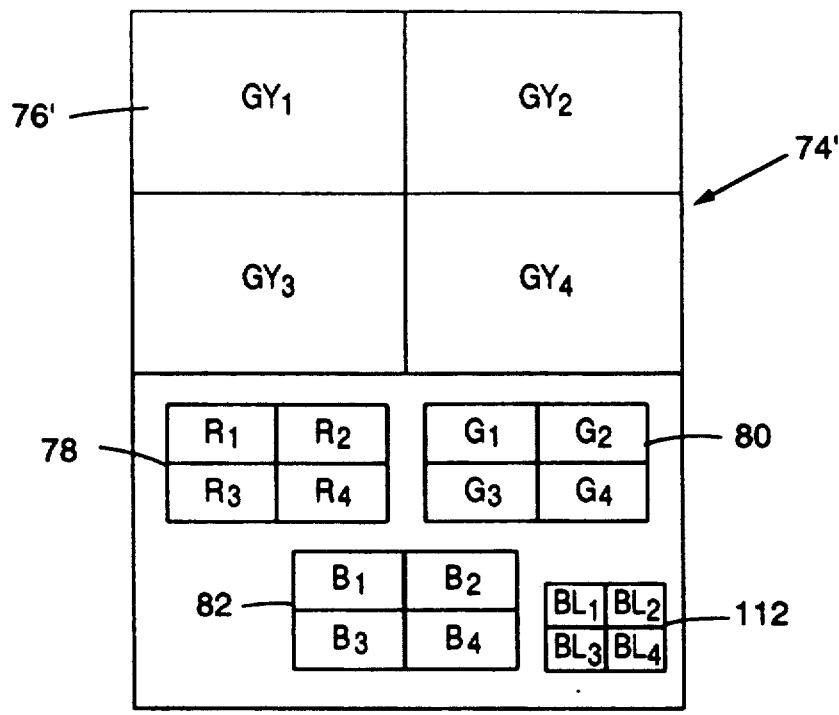
FIG. 6a is a two dimensional layout diagram of the "five color" components of four separate images and the black spot image to be recorded on a sheet of black and white film.

FIGS. 5a and 6a represent the "four-" and "five-color" black and white film composite images 74 and 74' of the present invention, respectfully. Each of the illustrated sheets of film in FIGS. 5a and 6a show each of the color components for four different composite images. Grey ($GY_x$) 76, red ($R_x$) 78, green ($G_x$) 80 and blue ($B_x$) 82 together make up a single image in FIG. 5a, and grey ($GY_x$) 76', red ($R_x$) 78, green ($G_x$) 80, blue ($B_x$) 82 and black spot ($BL_x$) 112 together make up a single image in FIG. 6a, where in both cases x=1 to 4. The lay-out of the various components of an image in either of FIGS. 5a and 6a is influenced by two factors; what is a convenient lay-out for a radiologist, or other professional, to read the grey image alone on a standard light box, and the physical limitations presented by the size, shape and mounting apparatus of the lenses in a projection system to display an image that is a composite of each of the individual color components. Projection systems will be discussed below in relation to FIGS. 7-9.

Figures 5B, 5C, 5D, 5E:
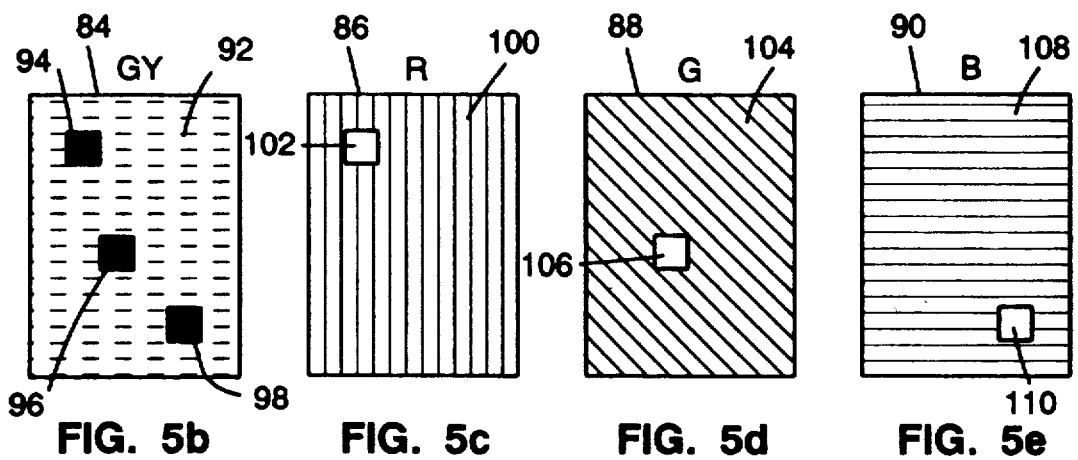
FIG. 5b illustrates a simplified enhanced grey scale image of the "four color" display.
FIG. 5c illustrates a simplified red image of the "four color" display.
FIG. 5d illustrates a simplified green image of the "four color" display.
FIG. 5e illustrates a simplified blue image of the "four color" display.

The details of the "four color" embodiment of the present invention are illustrated in a simplified form in FIGS. 5b-e. FIG. 5b represents the grey scale portion 84 of an image with the details, for example, of the organs of a patient as viewed by an ultrasound device, shown in varying shades of grey 92 and the locations of the composite image that are to appear in color are replaced by solid black pixels 94-98, resulting in an enhanced grey scale image, 84, according to this invention.

Figure 9:
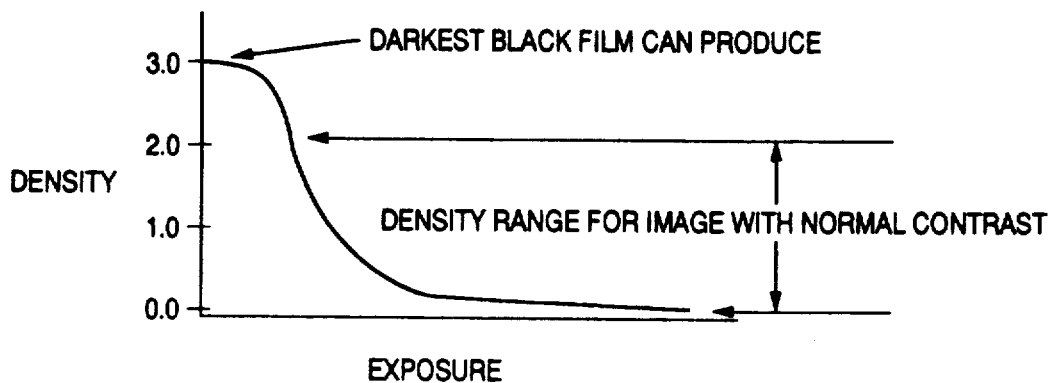
FIG. 9 illustrates the dynamic range of standard film.

A part of this invention is a method of creating an enhanced grey scale image from a composite color/grey scale image. The enhancement technique involves replacing the color pixels in the composite image with a distinct shade of grey not normally found in a grey scale image. This shade of grey will normally be the darkest black the film is capable of producing, a shade not normally found in a grey scale image adjusted for optimum contrast. This substitution of dark black for the color pixels unambiguously denotes where the color pixels are in the composite image. This enhances the diagnostic utility of the grey scale image further, and allows diagnosis of pathology based on degree of vascularization, degree of stenosis, or location of flow relative to tissue structure. FIG. 9 shows how the dynamic range of film is normally used in recording a greyscale ultrasound image. The density of the film is defined as −log(transmission), therefore an optical transmission of 1% is the same as a density of 2.0. In normal use, the film ranges from a density of around 2.0 to a density of around 0.0. This produces an image in which the eye can discern subtle differences in density in the image. The density range from 2.0 to 3.0 is almost never used. If it were, the image would appear to have too much contrast.

FIGS. 5c-e in turn illustrate the red, green and blue components 86-90, respectfully, of the composite image. In each of these components the pixels are either black (100, 104 or 108) or of varying shades of grey (102, 106 or 110) depending on the luminance in those regions of the composite image that is to be displayed with the color associated with that portion of the image. In the red component 86 of FIG. 5c the grey region 102 corresponds to the black region 94 in the grey component 84 of FIG. 5b. Similarly, in green component 88 of FIG. 5d the grey region 106 corresponds to the black region 96 in the grey component 84 of FIG. 5b, and in blue component 90 of FIG. 5e the grey region 110 corresponds to the black region 98 in the grey component 84 of FIG. 5b. Thus, when the four components of FIGS. 5b-e are placed in the projection system discussed below, light will pass through the grey region 92 and not the black regions 94-98, red light will pass through region 102 providing color to the black region 94, green light will pass through region 106 providing color to the black region 96 and blue light will pass through the region 110 providing color to the black region 98.

By blacking out the regions of the grey image where the colorization of the composite image is to be displayed, the veins and arteries of the internal organs imaged by ultrasound are clearly shown since color is added by ultrasound techniques where there is movement above a selected threshold velocity. This is useful in medical applications to reveal the actual size, location and position of veins and arteries. Thus by blacking out portions of the grey image where color will be added, the outline of the veins and arteries are clearly discernable to the radiologist by merely viewing the enhanced grey image, FIG. 5b.

Figure 6B:
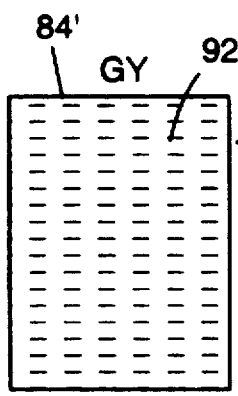
FIG. 6b illustrates a simplified grey image of the "five color" display.
Figure 6C:
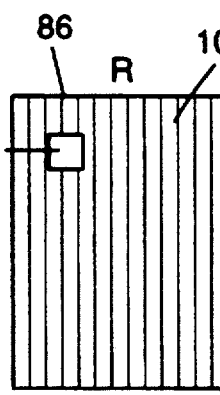
FIG. 6c illustrates a simplified red image of the "five color" display.
Figure 6D:
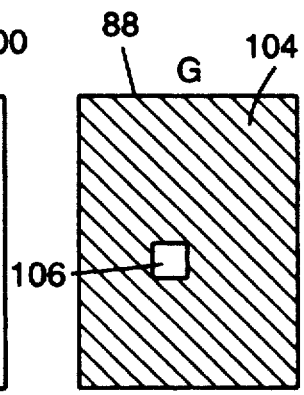
FIG. 6d illustrates a simplified green image of the "five color" display.
Figure 6E:
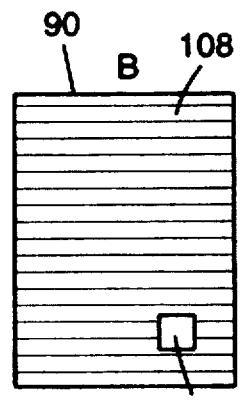
FIG. 6e illustrates a simplified blue image of the "five color" display.
Figure 6F:
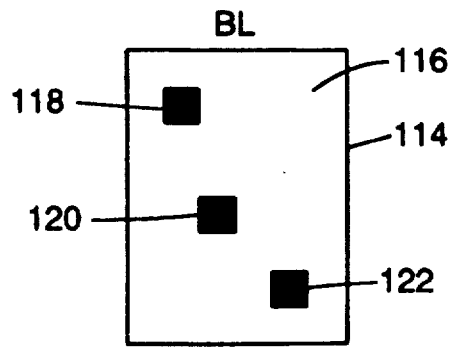
FIG. 6f illustrates the black spot map of the "five color" display.

The details of the "five color" embodiment of the present invention are illustrated in a simplified form in FIGS. 6b-f. FIG. 6b represents the full grey scale portion 84' of an image with the details, for example of the organs of a patient as viewed by an ultrasound device, shown in varying shades of grey 92'. FIGS. 6c-e in turn illustrate the red, green and blue components 86-90, respectfully, of the composite image. In each of these components the pixels are either black (100, 104 or 108) or of varying shades of grey (102, 106 or 110) depending on the luminance in those regions of the composite image that is to be displayed with the color associated with that portion of the image. Then in FIG. 6f there is shown the black spot component 114 of the composite image. In the black spot component the field 116 is clear (density 0.0) and there are black spots 118-122 (density 3.0) that correspond to the locations in the composite image that will display color. In the red component 86 of FIG. 6c the grey region 102 corresponds to the black region 118 in the black spot component 114 of FIG. 6f. Similarly, in green component 88 of FIG. 6d the grey region 106 corresponds to the black region 120 in the black spot component 114 of FIG. 6f, and in blue component 90 of FIG. 6e the grey region 110 corresponds to the black region 122 in the black spot component 114 of FIG. 6f. Thus, when the five components of FIGS. 6b-f are placed in the projection system discussed below, the viewer has several options. The unchanged grey image can be viewed without any enhancement by only back illuminating the grey component 84', an enhanced grey image can be illuminated by optically combining the full grey component 84' and the black spot component 114, the three color components can be illuminated without any grey or black spot images, the three color components can be illuminated with the grey image, or all five of the five-color components can be illuminated to create the color enhanced image from the collection of associated image components recorded on the same sheet of black and white film.

Color Separation Technique

Of the various types of instruments that perform color enhancement of black and white images based on non-color generating phenomena (e.g. in ultrasound images where color designates blood flow velocity), the pixels of the consolidated color enhanced image are generally presented to a monitor or an electronic camera digitally on an RGB bus or in analog RGB video with the grey portions of the image having been transformed to the appropriate combinations of those colors to display grey. The other form in which the color data may be presented by such instruments is in individual R, G and B pixel maps. Either way some degree of processing is necessary to generate the enhanced grey, or the grey and black spot, portions of the overall image from the RGB information. It should be noted that for purposes of discussion it is assumed that the color information is available in RGB space. If the color information is presented in another set of complementary colors, the same techniques can be applied or the colors can be converted to RGB by any of several well known conversion techniques. It is also assumed that the color separation technique of the present invention will be implemented in a combination of software and hardware, i.e. microprocessor and associated RAMs, ROMs and I/O devices. They could also be implemented using discreet components and are shown and discussed in that form for clarity and ease of understanding.

As discussed above, the present invention includes two forms in which the display information is presented to the user; the "four color" approach and the "five color" approach. The "four color" approach is illustrated by FIG. 2 and will be discussed first. The grey component of the overall image needs to be generated with black spots where there is color to be displayed in the composite image. To determine where the grey regions are in the composite image, the values of the intensity or luminance of each of the three colors are compared. For those pixels where those intensities are equal, the pixel is said to be grey having an intensity that is equal to the intensity of any one of the color pixels. For convenience, the intensity of the G pixel is selected as the intensity of the grey pixel. Where the intensities of the three color components are not equal, the pixel of the composite image is said to be a color pixel.

In general, it is necessary to specify a tolerance on how close to grey a pixel is (i.e. how closely R, G and B must match). This tolerance is denoted as T. Mathematically, the separation process is as follows:

For all pixels in the image, at location (x,y)

If $(G_{xy}=R_{xy}+/-T)$ AND $(G_{xy}=B_{xy}+/-T)$ <i.e. the pixel is grey>

THEN $grey_{xy} = G_{xy}$    <Luminance ~ green value>
$red_{xy} = RB$
$green_{xy} = RB$
$blue_{xy} = RB$

OTHERWISE $grey_{xy} = RB$
$red_{xy} = R_{xy}$
$green_{xy} = G_{xy}$
$blue_{xy} = B_{xy}$ where RB is the reserved byte and R, G and B are the Red, Green and Blue bytes. The reserved byte (density 3.0) is used to denote where no pixel value is present in the separated image (i.e. color pixels in the grey map and grey pixels in the color maps).

The above algorithm is applied to all pixels in the image to complete the separation process.

One method of implementing this where zero tolerance is necessary is as shown in FIG. 2. On the left side of FIG. 2 there is shown a 24 bit RGB bus 20 with each pixel in the image being represented by 8 bits of data for each of the colors red, green and blue. The individual 8 bit R, G and B buses 22-26, respectfully, are split from bus 20 and connected to one of the two input signal lines of multiplexers 44-48. Additionally, the G bus 24 is connected to one of the signal input lines of the grey multiplexer 42. The other signal input terminal of each of multiplexers 42-48 is connected to the 8 bit reserved byte bus 50 with the reserve byte representing the full black value that is to be inserted into the individual R, G, B and grey data streams when that color is not included as a part of the pixel of interest.

The R bus 22 is also connected to one input terminal of comparator 28, B bus 26 is connected to one input terminal of comparator 30, and G bus 24 is connected to each of the other terminals of both comparators 28 and 30. When the 8 bits on the R bus equals the 8 bits on the G bus, the output signal on line 32 of comparator 28 goes high (R=G), and when the 8 bits on the B bus equals the 8 bits on the G bus, the output signal on line 34 of comparator 30 goes high (B=G). Lines 32 and 34 are then connected to NAND gate 36 for generation of the inverse of the signal R=G=B on line 38. Since R=G=B has been defined as the test for a grey pixel, the inverse of that relationship indicates the presence of color. Thus, when the signal on line 38 is high the values of colors R, G and B are to be transmitted by multiplexers 44-48 and dark black (the reserved byte) is to be transmitted by the grey multiplexer 42. When the signal on line 38 is low the opposite is true, namely dark black (the reserved byte) is transmitted by the color multiplexers 44-48 and substantially the intensity or luminance of the G bus (selected arbitrarily as discussed above) is transmitted by the grey multiplexer 42. To perform that operation, line 38 is connected to the select terminal of each of multiplexers 44-48 and via invertor 40 to the select terminal of multiplexer 42. Therefore, for the "four color" embodiment discussed above, the signal on line 52 from grey multiplexer 42 will be present when there are no color signals from any of the color multiplexers 44-48 and black when there is a color signal from any one of the color multiplexers 44-48. Conversely, the signals on lines 54-58 will be the respective color luminance signals when the signal from grey multiplexer 42 is black, and black when there is a grey signal on line 52 (see FIGS. 5b-e). Even though this embodiment is shown as a discrete component embodiment, it could easily be implemented in software or firmware.

A tolerance is not necessary if the digital data is always exactly R=G=B for pixels which are intended to be grey. This will generally be the case if the data is generated by an instrument such as a ultrasound imaging machine. When the data is from digitalized video sources distorted by digital to analog conversion and then resampled, or if noise has gotten into the system, then a tolerance parameter may be necessary. To account for tolerances in a second embodiment of the four color embodiment, comparators 28 and 30 will need to be window comparators. A window comparator consists of two comparators and associated combinatorial logic circuits. One comparator of the window comparator that replaces comparator 28 functions to determine if the green pixel value is greater than the red pixel value minus the tolerance ($G > R - T$), and the second comparator functions to determine if the green pixel value is less than the red pixel value plus the tolerance ($G < R + T$). If both of these conditions are met, then $G = R \pm T$. Similarly for the window comparator that replaces comparator 30, one comparator functions to determine if the green pixel value is greater than the blue pixel value minus the tolerance ($G > B - T$), and the second comparator functions to determine if the green pixel value is less than the blue pixel value plus the tolerance ($G < B + T$), wherein if these conditions are met $G = B \pm T$. Then if $G = R \pm T$ and $G = B \pm T$, $G = R = B$ and the pixel is grey. The remainder of the circuit of FIG. 2 is unchanged.

Figure 11:
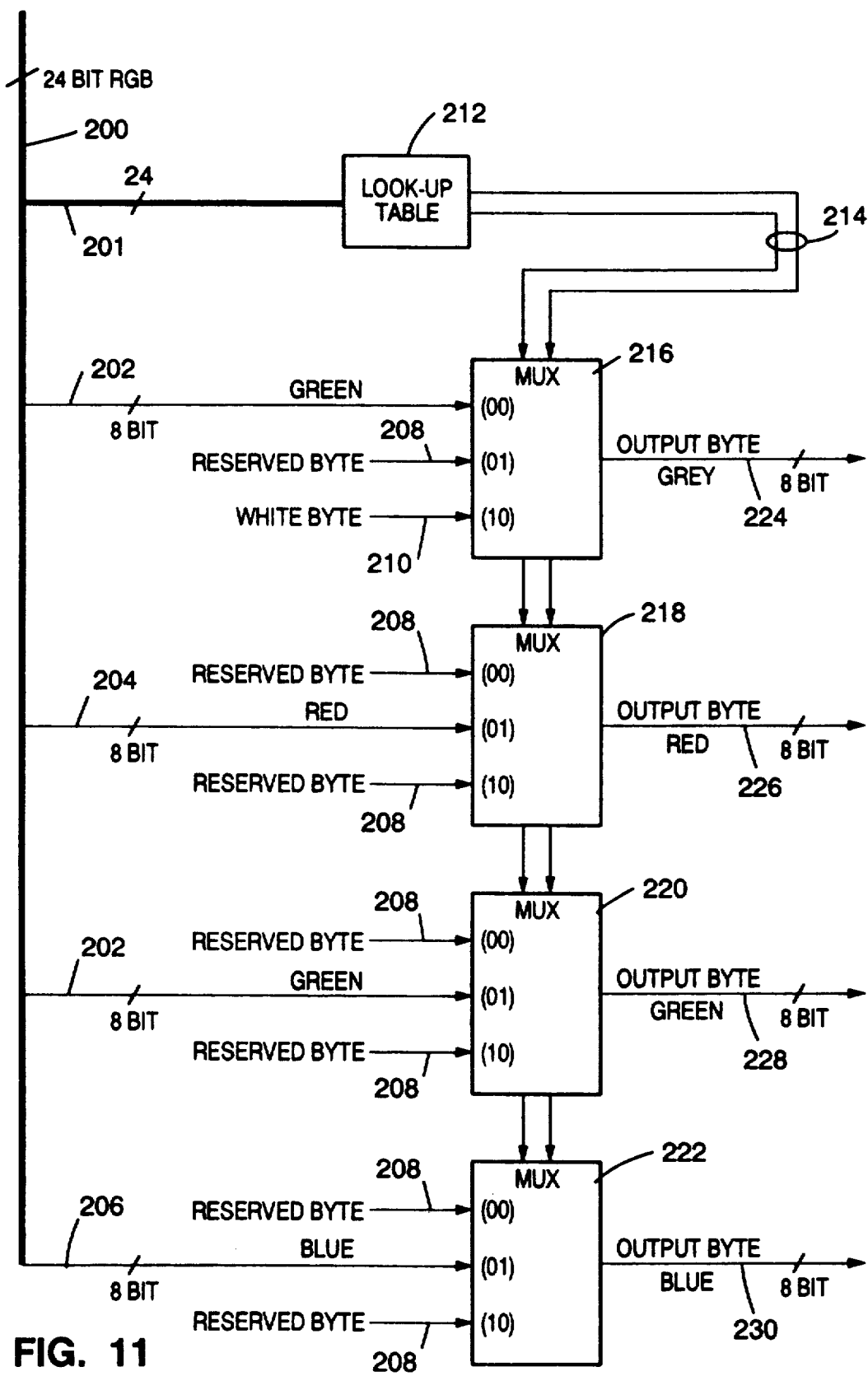
FIG. 11 is a block diagram of third embodiment of the present invention for the separation of the combined RGB pixels to create "four color" image maps: an enhanced grey scale image, where no color information has been added to the image, and individual color components for the color that has been added to the composite image.

A second implementation of the "four color" approach is illustrated in FIG. 11. As in the implementation of FIG. 2, the grey component of the overall image may be generated with black spots where there is color to be displayed in the composite image. This implementation also allows for the insertion in the grey image of white pixels where a predetermined relationship between the three colors exists. That relationship can be selected to be artificial settings of the intensity value for each of the three color components at selected pixels to the maximum value, or any other convenient relationship which generally does not occur in the actual image being recorded. The setting of the three color components of the image to such a predetermined value can then be detected as an override of the actual information in selected regions of the image for generating a time and date stamp, or some other label, on the overall image. This permits, for example, color annotation to be treated as though it were white. Without the addition of the white pixels in the grey image, the same result is generated by this implementation as was generated in the implementation of FIG. 2.

The intensity of each of the three colors, RGB, are digitally encoded in 8 bit bytes (0-255) thus each has a finite number of intensity values. Also, the selected tolerance within which the intensities must be to find that a pixel should be recorded as a grey pixel is a fixed finite number. Given that, a look-up table can be generated using the appropriate algorithms and the set of possible color intensity values to determine if the corresponding pixel is to be displayed in the composite image as grey, white or in color since there can only be one result for each combination of the intensity values of the three colors from bus 200. Look-up table 212 is then loaded with those values and the eight bits of each of the three colors on bus 200 are used as the address values to look-up table 212. The two output lines 214 from look-up table 212 control the selection of the input bytes that are passed to the output ports of multiplexers 216-222. For example, 00 on lines 214 might designate that the pixel is to be displayed as grey, 01 for displaying a color pixel, and 10 to display a white or other special color pixel.

In the upper portion of FIG. 11 the green byte is shown being applied to the 00 input terminal, the reserve byte (black) to 01 input terminal, and the white byte to the 10 input terminal of multiplexer 216. Similarly, the reserved byte is applied to both the 00 and the 10 input terminals, and the associated color byte to the 01 input terminal of each of multiplexers 218-222, respectively.

Thus, the white and grey pixel information is stored in the grey image with black spots when the pixel is to be displayed in color. Correspondingly, color pixel information is stored in the appropriate color image with black spots at the pixel locations where the overall image is to be grey or white. Thus, when the control signal on lines 214 are 00 or 10, the intensity byte of the green signal or the white byte is passed through grey multiplexer 216, respectively, and the reserved byte is passed through each of multiplexers 218-222. And when the control signal on lines 214 is 01, the reserved byte is passed through grey multiplexer 216 and the corresponding color intensity byte is passed through multiplexers 218-222.

Figure 3:
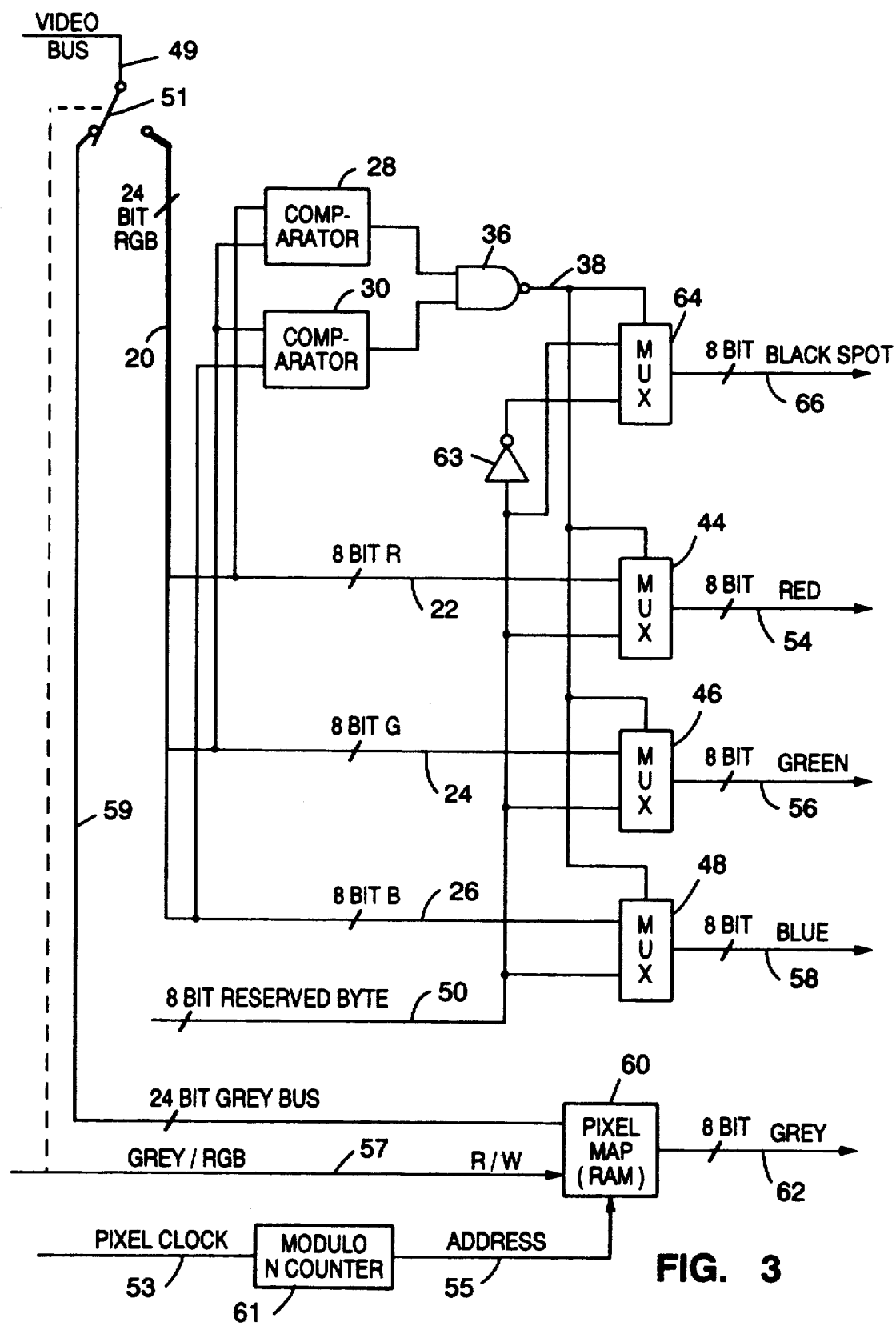
FIG. 3 is a block diagram of another embodiment of the present invention for the separation of the combined RGB pixels to create "five color" image maps: a grey image, a black spot mask wherein the pixel locations of the spots coincide with the pixel locations where color information has been added to the composite image, and individual color components for the color that has been added to the composite image.

To generate the necessary signals for the "five color" embodiment of the present invention the grey and black spot components of the image must be generated separately which requires a modification of the circuit of FIG. 2. One form of such a modified circuit is shown in FIG. 3. In FIG. 3 each of the elements that are the same as in FIG. 2 are shown with the same reference numbers as in the previous figure. It is also necessary to develop the grey scale image separately from the red, green, blue and black spot images since the grey scale image here is not the enhanced image that is one of the colors of the four color system. When the color is added to the overall image as in an ultrasound system, the structural details (i.e. the greyscale shading in the regions where color is added) are lost in the regions where the color is added, therefore, the grey image of the five color system can not be reconstructed from the RGB bus as in the four color system of FIG. 2. To obtain the five color components here it is necessary to do it in two steps. The greyscale image of the entire frame is determined and stored, then the color enhancing function (e.g. color doppler function of an ultrasound system) of the detecting device is activated to determine the red, green, blue and black spot images in much the same way as in the four color system of FIG. 2.

The video bus 49 from the detecting device is connected to either the grey bus or the RGB bus through switch 51, the position of which is controlled by the state of the mode control signal on control line 57. When the selected mode is the grey mode, switch 51 is in the position shown and the video bus is connected to grey bus 59. When the selected mode is the color enhanced mode, switch 51 is in the other position from that shown and the video bus is connected to the RGB bus 20. The grey mode is initially selected to record the grey image in RAM 60 in the form of a pixel map. RAM 60 is set to write when the grey mode has been selected by the signal on line 57, the grey bus is then read into RAM 60 with the address at which each pixel is stored being generated from a pixel clock signal on line 53 that is applied to a modulo N counter 61 (where N is the number of pixels in the image) to generate the address signal on line 55.

After the grey image is stored in RAM 60, the mode of the detecting device is switched to the color enhancement mode which causes switch 51 to assume the second position and the video bus 49 to be connected to RGB bus 20. The red, green and blue images are each generated here as they were in the four color system of FIG. 2. The black spot component is generated from the reserved byte value (black) and the inverse of the reserved byte value (white) in response to the signal on line 38. Thus, when the signal on line 38 is high the reserved byte (black) appears on line 66 and when the signal on line 38 is low the inverse of the reserved byte (white) appears on line 66. As the red, green, blue and black spot images are being generated as described above, RAM 60 is in the read mode and the pixel clock via counter 55 is generating the addresses to RAM 60 so that the grey image bytes appear on line 62 at the same rate and at the same time as the corresponding bytes of the red, green, blue and black spot bytes appear on lines 54, 56, 58 and 66, respectively.

Figure 4:
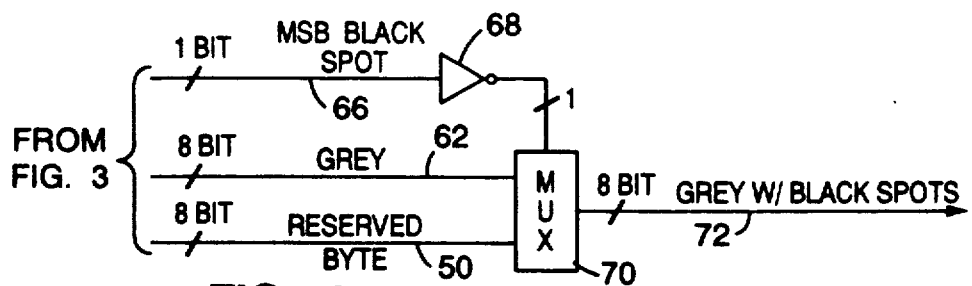
FIG. 4 is a block diagram of the additional circuitry for FIG. 3 to create the enhanced grey scale image as in FIG. 2.

Next, referring to FIG. 4 there is shown the circuitry to convert the "five color" embodiment to a "four color" embodiment by combining the black spot signal on line 66 with the grey signal on line 62 of FIG. 3 to generate the enhanced grey signal. From discussions above it will be remembered that the enhanced grey signal is the grey signal with black spots included where the composite image has been modified to display a color. Here there is shown a multiplexer 70 with the select signal being the signal from invertor 68 which produces the inverse of the black spot signal on line 66. When the select signal is low the reserved byte, or black spot, passes through multiplexer 70, and conversely, when the select signal is high the grey signal passes through multiplexer 70.

The image could be separated in other ways and still be useful in the present invention. The crucial step in this novel separation process is to identify and extract the grey pixels from the image, with the reserved byte denoting missing (color) pixels either in an enhanced grey component or in a separate black spot component. This image, when placed on x-ray film, provides the majority of the diagnostic information to the radiologist without the need for color image reconstruction. Other methods could separate the remaining color pixels in some other manner, such as separation into red, yellow, green and blue components. This alternative separation method might provide slightly better color image quality but in general would carry a higher cost which is not believed to be necessary.

Recording Technique of Color Signals on Black and White Film

The constituent images, which are described by the four or five arrays, can be placed on film in a variety of ways. If the film recording device is a standard multi-image camera (commonly used in hospitals to record images generated by imaging machines), it has a video input for the individual images. The required video signal is created from the arrays using a video card designed for this purpose. These video cards can be plugged into a personal computer and will generate a video signal corresponding to the desired image when the pixel values from the array are stored in the appropriate memory locations on the card. One such card is the NuVista card manufactured by Truevision of Indianapolis, Ind. If the film recording device is of some other type, it may be possible to send the digital data directly to it. These details depend on the specifics of the film recording device selected. More than one color image would normally be stored on the film. In this case, constituent images of a similar type would normally be grouped together, in order to make the design of the projection apparatus as simple as possible. For example, the grey images would be grouped together as would the red, green and blue images.

There are a variety of ways the "color" and greyscale images can be recorded onto so called x-ray film. X-ray film is actually not designed to be exposed by x-rays to record the desired image. The film is only sensitive to blue and green light. X-ray film is black and white transparent film in standard 8"×10" sheets, with a certain standard speed and tonal range.

In practice with ultrasound systems 6 or 9 images are generally recorded on one sheet of film. This is accomplished with a camera that has a video input port, magnification means for producing a recorded image of the size and format chosen, and stepper motors which move the film cassette to the various positions to record the various images. These cameras are called Multi-Image Cameras. The video input signals for these cameras are generated directly from a digital video bus by D/A convertors designed for this purpose or the signals can be generated by standard personal computer video cards. With such a camera, the four and five color constituent images can be recorded on a sheet of black and white x-ray film in a similar fashion to the color recording of the full color image on color film as in the prior art. That is, by manipulating the stepper motors and by electronically varying the magnification of the individual constituent images as desired, a four or five color image of the type shown in FIGS. 5a and 6a, respectively, can be recorded on black and white film from video signals (i.e from FIGS. 2 and 3).

There is another class of film recorders which accept a direct digital input. These film recorders are available from 3M, Kodak and Polaroid. The 3M and Kodak systems accept digital data files directly, then use this information to laser scan a light sensitive film. The Polaroid system accepts digital data or a video signal, and uses a laser to expose a proprietary sensitive film. Either of these types of film recorders can be driven by a computer. In all cases, the digital data represents an array of pixels with the value in each cell controlling the density of the corresponding pixel on the film. Therefore, the red, green, blue, grey and black spot image files can be directly printed without the printer needing to know what color component they represent.

Black and White Film Reading Technique

As discussed above the "four color" and "five color" formats for the recorded images are illustrated in FIGS. 5a and 6a, respectively. Also as discussed above, if the radiologist wishes to only view the enhanced grey component, 84, or the grey component, 84', of the image, that can be done in the same way as ordinary x-ray film images are viewed today, i.e., by placing the sheet of film on a light box. To view the composite image, or any portion of it, a projection system is necessary.

Figure 7:
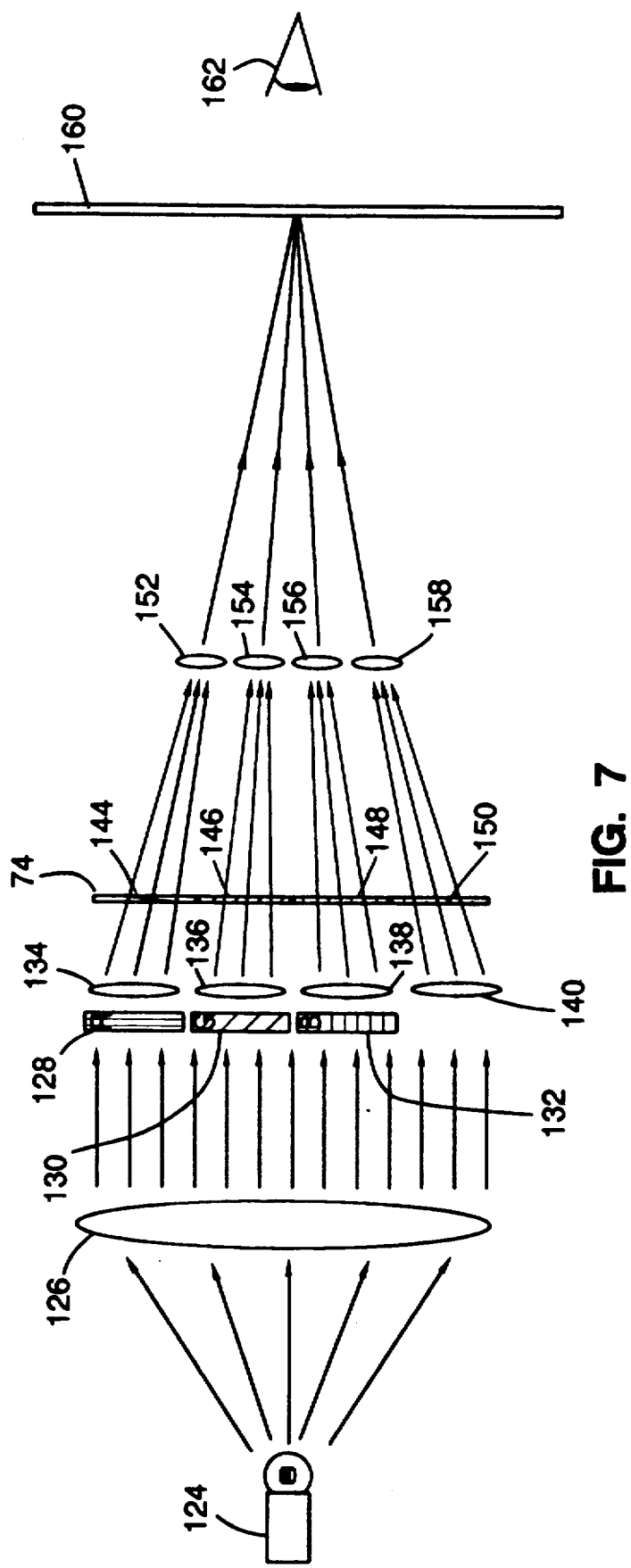

One projection system for the "four color" black and white film record of FIG. 5a is shown in FIG. 7. Shown here is a lamp 124 that emits a white light that is collimated by lens 126. The collimated light from lens 126 is then directed to red, green and blue filters 128-132, and through a space which is unfiltered. This yields four colors of light; red, green, blue and white. Each of those four hues of collimated light are then applied to individual condensing lenses 134-140 which are located adjacent the filter plane of the projector. Lenses 134-140 are selected to have a focal length to focus the light which passes through them onto corresponding projection lenses 152-158. The black and white "four color" image sheet of film 74 is placed intermediate condensing lenses 134-140 and projection lenses 152-158, so that the red, green, blue and white light from condensing lenses 134-140 pass through the red, green, blue and grey component images of the corresponding composite image on film 74. The four regions 144, 146, 148 and 150 on film 74 correspond to FIGS. 5c, 5d, 5e and 5b, respectively. The light that is transmitted through each region of the four regions on film 74 is then focused individually by lenses 152-158 to the same spot on translucent frosted screen 160 where the individual images are superimposed to recreate the composite image to be viewed by observer 162. It is lenses 152-158 that also perform the function of magnification of each component of the composite image depending on the size relationship of each of the component images on film 74. Additionally, this projection system could also be used to view only the grey image 150 on film 74 by including three shutters somewhere in the path of each of the three colored light beams. Similarly, FIG. 7 illustrates that this projection system could also be used to view only the color images 144-148, or any one or combination thereof, by also including a shutter in the path of the white light beam. The most efficient location for these shutters would be directly behind projection lenses 152-158.

Figure 8:
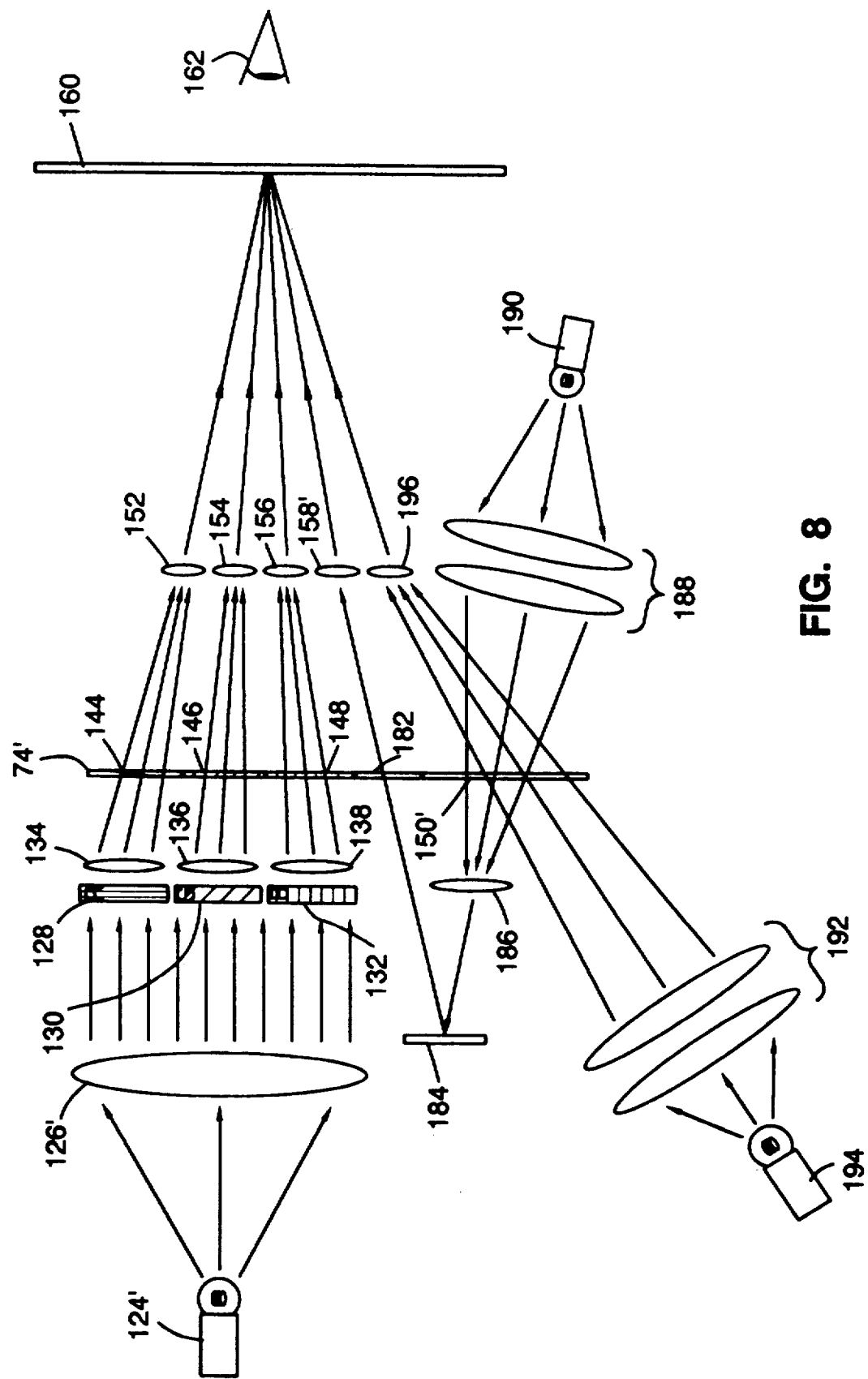

A projection system for a "five color" black and white record of FIG. 6a is shown in FIG. 8. Since the grey image in the five color system is a full grey image and not the enhanced grey image of the four color system there are several projection possibilities. One is the grey image alone, another is the enhanced grey image which is obtained by optically combining the grey image with the black spot image, and a third is the projection of the color enhanced image which requires the projection of all five images.

A portion of the "five color" projection system is similar to the "four color" projection system of FIG. 7. The similarities are in the projection of the red, green and blue images 144-148 of the five color record 74'. As discussed in relation to FIG. 7, lamp 124' emits a white light that is collimated by lens 126'. The collimated light from lens 126' is then directed to red, green and blue filters 128-132. This yields three colors of light; red, green and blue. Each of those three hues of collimated light are then applied to individual condensing lenses 134-138 which are located adjacent the filter plane of the projector. Lenses 134-138 are selected to have a focal length for focusing the light which passes through them onto corresponding projection lenses 152-156. The black and white "five color" image sheet of film 74' is placed intermediate condensing lenses 134-138 and projection lenses 152-156 so that the red, green and blue light from condensing lenses 134-138 pass through the red, green and blue component images of the corresponding composite image on film 74'. The remaining light transmitted through each region on film 74' is then focused individually by lenses 152-156 to the same spot on translucent frosted screen 160 where the individual images are superimposed to recreate the composite color portions of the image to be viewed by observer 162. It is lenses 152-156 that also perform the function of magnification of each component of the composite image depending on the relationship of each of the component image sizes on film 74'. Since the red, green and blue portions of the overall image are only needed when a color enhanced images is being projected, lamp 124' is only illuminated for the third projection possibility discussed above.

The first projection possibility referred to above of the grey and black spot images on the five color film 74' is accomplished in a manner that is very different from what was done in the four color projection system. To project only the full grey image 150' from film record 74', lamp 194 is turned on with the light from lamp 194 being collimated and focused by lenses 192. The focused light from lenses 192 passes through the grey image on film 74' and is focused onto projection lens 196. Lens 196 then magnifies, as necessary, the grey image and focuses it onto translucent frosted screen 160 for viewing by observer 162. Lamp 194 and lenses 192 and 196 only are used in the projection of the full grey image alone.

The second projection possibility referred to above is the projection of the enhanced grey image which is the optical combination of the full grey image and the black spot image. This is accomplished by the illumination of lamp 190 with the radiated light being collimated and focused by lenses 188. The light from lenses 188 is converging on the entrance pupil of grey projection lens 186 passing through the full grey image 150' on film 74' which is located between lenses 188 and lens 186. After passing through projection lens 186 the projected grey image is reflected by mirror 184 through the black spot image 182 of film 74'. Since the black spot image is black where color was added to the composite image and is clear in all other regions, the image that leaves the black spot region of film 74' is the combination of the two images (i.e. the full grey image 150' and the black spot image 182) forming what was referred to as the enhanced grey image (FIG. 5b or 150) in the "four color" system above. As a result of the magnification and location angles of lenses 188 and 186, and mirror 184, the enhanced grey image leaves film 74' directed to secondary projection lens 158' that directs and focuses the enhanced grey image onto translucent frosted screen 160 for viewing by observer 162 at the same location that the red, blue and green components are projected in the third projection possibility referred to above. Lamp 190, lenses 188, 184 and 158', and mirror 184 are used alone for the second projection possibility and together with lamp 124' and the associated red, green and blue projection system for the third projection possibility.

The arrangement shown in FIG. 8 also illustrates other projection possibilities. If the three color image projection is desired without grey portions present, lamp 124' only is used. If only a part of the color image is desired, a shutter system can be employed as in FIG. 7. If a grey, color overlay projection is desired, only lamps 124' and 194 are used. As is apparent, the grey, color overlay will be most useful where the intensity or brightness of the color images is sufficient to be visible over the grey image, in which case lamp 190 and associated lenses and mirror could be absent from the projection system.

To make such a projection system most practical, several ideas can be implemented as a part of the projection system. For example, the lamp could be operated at a high temperature to ensure that the blue component to the white light is sufficient for good image reconstruction. A reflector can also be placed behind the lamps to make maximum use of the light emitted by them. The collimating lenses and condensing lenses can be implemented with lower cost Fresnel lenses, and the projection lenses need to be high quality imaging lenses to achieve superposition of the four images on screen 160 with high spatial and contrast resolution. Typically, the projection lenses will be multi-element, photographic quality lenses. Further, filters 128-132 can be either absorbing filters or, because they are operating in collimated light, multi-layer interference filters. Multi-layer interference filters will generally provide higher optical efficiency and should be used if efficiency becomes a problem. It should be noted that the projector is shown here in a planar format for conceptual ease, however, a more compact projector would have the lenses arranged so that their axes are in a rectangular or parallelogramatical arrangement.

Figure 10:
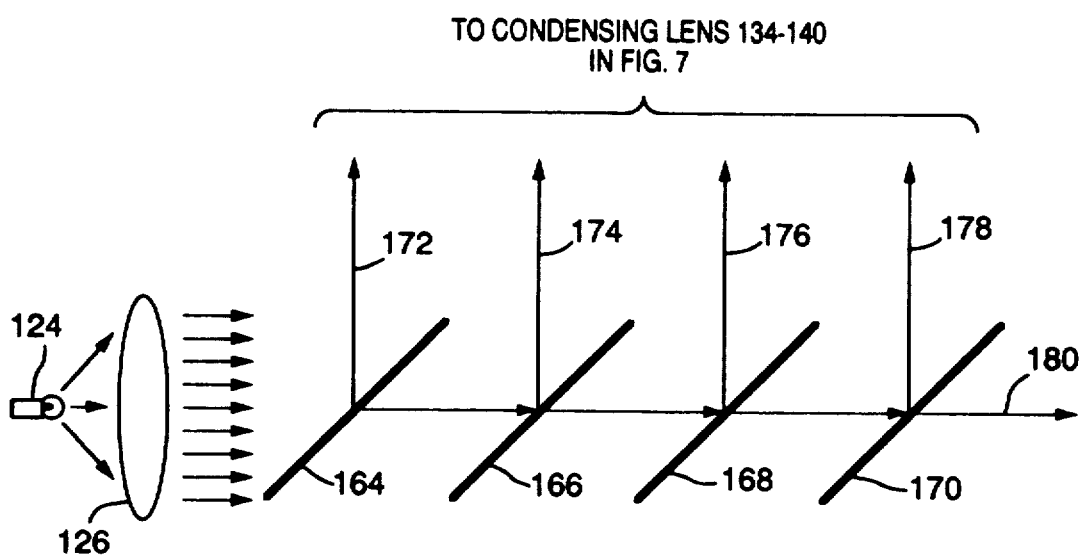
FIG. 10 is a schematic representation of an alternative color separation technique for use in a projection system.

Color filters 128-132 of FIG. 7 can be replaced with a set of achromatic and dichroic beam splitters as shown in FIG. 10. Lamp 124 is a source of white light that is collimated by lens 126 and then serially impinged on four beamsplitters 164-170. The collimated white light first strikes achromatic beamsplitter 164 with a portion of the white light 172 being reflected upward and the remainder passing through beamsplitter 164. The light passing through beamsplitter 164 next impinges on red dichroic beamsplitter 166 with a portion of the red component of the light reflected upward as red light beam 174. Similarly, green light 176 and blue light 178, are reflected upward by green and blue dichroic beamsplitters 168 and 170, respectively, with any unreflected light passing out of the system as beam 180.

The transmissive projection screen must be an excellent diffuser of light because the component images are all approaching the screen from different angles and it is important that all observers of the projected image see the same thing (including each eye of the same observer). At the same time, the screen must not degrade the spatial resolution of the image. These two requirements are best met by a thin, high efficiency diffuser film bonded to a sheet of glass. One such film which has been found to work is a white polyester film that is two thousandths of an inch thick. The particles are small and numerous enough to provide good diffusion and the thinness preserves the spatial resolution.

Other projection systems could also be employed and will be mentioned here. The first of these would be to project the image onto a reflective screen. This may be more optically efficient (produce a brighter image) than a transmissive projection screen. The other alternative is to project the image directly onto the retina of the viewer's eye or at some point in space for viewing by the user. This type of system eliminates the need for a screen entirely, and should produce the highest image quality. In operation, the user could look into a device that looks like a binocular or microscope.

The images can be illuminated simultaneously or sequentially. If sequential illumination of images is rapid enough, the appearance to the eye will be the same as simultaneous illumination.

The separation method which is the subject of the present invention greatly reduces the cost and mechanical precision needed in the projection device because the grey portions of the image are not formed from multiple images as they would be in a simple three color (Red, Green and Blue) separation. In the three color separation, the three images must be precisely superimposed on one another in order to avoid color fringing in the grey regions of the image. Since the spatial resolution required in the grey areas is so high, this places very high demands on the optical system to project images with little distortion, requires lenses to be very accurately spaced, and requires that the images on the film be placed in very accurate locations, with very low distortion. The separation method described in the present invention greatly relaxes these requirements because the alignment of the color components to one another and to the grey scale image is not nearly as critical. Furthermore, the color balance of the grey region of the image is automatically correct with the separation method which is the subject of the present invention. In a three color separation, this color balance would depend on the relative brightness of the red, green, and blue images.

What is claimed is:

1. A method for decomposing an image that has been color enhanced in selected regions with color added to depict a variable characteristic that is color independent so that changes in that characteristic can be determined, said image being presented electronically as three complementary color bytes or analog equivalents thereof for each pixel with the value encoded in each byte or analog equivalent thereof being the intensity of that complementary color at that pixel of the image, said decomposition being into four constituent maps including a grey scale original image map of the regions where no color has been added and three complementary color maps of the color enhanced regions of the image, said method comprising the steps of:

a. examining the intensity values of each of said three complementary color bytes or analog equivalents thereof at the same pixel location of said image;
   b. setting the pixel intensity value in the grey scale image map to substantially the intensity value of a selected one of said three complementary color bytes or analog equivalents thereof if each of the examined intensity values in step a. of each of said three complementary color bytes are within a selected tolerance of being equal to each other;
   c. setting the pixel intensity value in each of the three complementary color maps to the zero intensity value if each of the examined intensity values in step a. of each of said three complementary color bytes or analog equivalents thereof are within a selected tolerance of being equal to each other;
   d. setting the pixel intensity value in the grey scale image map to the zero intensity value if each of the examined intensity values in step a. of each of said three complementary color bytes or analog equivalents thereof are not within a selected tolerance of being equal to each other;
   e. setting the pixel intensity value in each of the three complementary color maps to the corresponding one of the intensity values of said three complementary color bytes or analog equivalents thereof if each of the examined intensity values in step a. of each of said three complementary color bytes or analog equivalents thereof are not within a selected tolerance of being equal to each other; and
   f. repeating steps a. through e. for each pixel location in said image.

2. A method as in claim 1 further includes the step of:

g. recording the pixel intensity value of the grey scale image map and the pixel intensity value of each of the three complementary color maps from steps a. through e. for each pixel location in said image as four separate images on a single sheet of black and white film.

3. A method as in claim 2 wherein the color maps forming the three corresponding color images on the film are smaller in size than the grey scale map forming the gray scale image on the film.

4. A method for forming an enhanced grey scale image by decomposing an image that has been color enhanced in selected regions with color added to depict a variable characteristic that is color independent so that changes in that characteristic can be determined, said image being presented electronically as three complementary color bytes or analog equivalents thereof for each pixel with the value encoded in each byte or analog equivalent thereof being the intensity of that complementary color at that pixel of the image, said decomposition being into a grey scale original image map of the regions where no color has been added, said method comprising the steps of:
  a. examining the intensity values of each of said three complementary color bytes or analog equivalents thereof at the same pixel location of said image;
  b. setting the pixel intensity value in the grey scale image map to substantially the intensity value of a selected one of said three complementary color bytes or analog equivalents thereof if each of the examined intensity values in step a. of each of said three complementary color bytes are within a selected tolerance of being equal to each other;
  c. setting the pixel intensity value in the grey scale image map to the desired intensity value if each of the examined intensity values in step a. of each of said three complementary color bytes or analog equivalents thereof or analog equivalents thereof are not within a selected tolerance of being equal to each other; and
  d. repeating steps a. through c. for each pixel location in said image.

5. A method for reconstructing a color image from four constituent image portions recorded on black and white film wherein one image portion corresponds to a grey scale image with zero intensity pixels in those pixel locations where the composite image includes color information and three image portions each corresponding to one of three complementary color images each with zero intensity pixels in those pixel locations where the composite image is to be grey, said method comprising the steps of:
  a. illuminating said grey scale image portion of said black and white film with white light, and each of said three other image portions of said black and white film with light having a color that corresponds to the color information of the corresponding one of the three complementary color images; and
  b. focusing the light passing through each of said four constituent image portions of said black and white film to the same point to create a composite grey and color image.

6. A method as in claim 5 wherein the four constituent image portions are focused on a viewing screen.

7. A method for storing on black and white film the constituent parts of a composite color image that has been color enhanced in selected regions with color added to depict a variable characteristic that is color independent so that changes in that characteristic can be determined, said image being presented electronically as having a plurality of parts, the intensity of each pixel of each part represented electronically, said method comprising the step of recording the electronically presented pixel intensity value of each of said plurality of parts for each pixel location in said composite image as a plurality of separate images on a single sheet of black and white film.

8. A method as in claim 7 wherein said plurality of parts includes three complementary color parts each with black pixels in those locations other than the pixel locations for that complementary color and where the composite image is to be grey.

9. A method as in claim 7 wherein said plurality of parts includes a grey scale part with black pixels in those pixel locations where the composite image includes color information and three complementary color parts each with black pixels in those pixel locations where the composite image is to be grey.

10. A method as in claim 7 wherein said plurality of parts includes a grey scale part with intensity information at each pixel location, a black spot part with black pixels in those pixel locations where the composite image includes color information and clear pixels where no color information is included in the composite image, and three complementary color parts each with black pixels in those pixel locations where the composite image is to be grey.

11. A method as in claim 9 wherein said three color parts are smaller than the grey scale part on the film.

12. A method as in claim 10 wherein said three color parts are smaller than the grey scale part on the film.

13. A method for storing on black and white film an enhanced grey scale image derived from the constituent parts of a composite color image that has been color enhanced in selected regions with color added to depict a variable characteristic that is color independent so that changes in that characteristic can be determined, said image being presented electronically as having a plurality of parts, the intensity of each pixel of each part represented electronically, said method comprising the step of recording the electronically presented pixel intensity value of each of said plurality of parts for each pixel location in said composite image on a single sheet of black and white film, wherein said plurality of parts includes a grey scale part with black pixels in those pixel locations where the composite image includes color information.

14. A method for storing on black and white film the constituent parts of a composite color image that has been color enhanced in selected regions with color added to depict a variable characteristic that is color independent so that changes in that characteristic can be determined, said image being presented electronically as having a plurality of parts, the intensity of each pixel of each part represented electronically, said method comprising the step of recording the electronically presented pixel intensity value of each pixel location in said composite image as a plurality of separate images on a single sheet of black and white film, wherein said plurality of parts includes a full grey scale image part and three complementary color parts, each part with black pixels in those locations respectively, where the composite image is grey and where there is complementary color present in the composite image.

15. A method for decomposing an image that has been color enhanced in selected regions with color added to depict a variable characteristic that is color independent so that changes in that characteristic can be determined, said image being presented electronically first as a collection of grey scale bytes or analog equivalents thereof with the value encoded in each byte or analog equivalents thereof being the intensity of the grey scale at the corresponding pixel of the image without color enhancement and second as a collection of three complementary color bytes or analog equivalents thereof for each pixel with the value encoded in each byte or analog equivalent thereof being the intensity of the corresponding color at that pixel of the image, said decomposition being into five constituent maps including a grey scale original image map, a black spot image map, and three complementary color maps of the color enhanced regions of the image, said method comprising the steps of:

a. storing said grey scale bytes or analog equivalents thereof for the complete grey scale image in a pixel map;

b. examining the intensity values of each of said three complementary color bytes or analog equivalents thereof at the same pixel location of said image;

c. setting the pixel intensity value in the black spot image map to the maximum intensity value if each of the examined intensity values in step b. of each of said three complementary color bytes or analog equivalents thereof are within a selected tolerance of being equal to each other and storing same on a separate pixel map having coordinates corresponding to the same pixel location on the grey scale pixel map of step a;

d. setting the pixel intensity value in each of the three complementary color maps to the zero intensity value if each of the examined intensity values in step b. of each of said three complementary color bytes or analog equivalents thereof are within a selected tolerance of being equal to each other and storing same on a separate pixel map having coordinates corresponding to the same pixel location on the grey scale pixel map of step a;

e. setting the pixel intensity value in the black spot image map to the zero intensity value if each of the examined intensity values in step b. of each of said three complementary color bytes or analog equivalents thereof are not within a selected tolerance of being equal to each other and storing same on a separate pixel map having coordinates corresponding to the same pixel location on the grey scale pixel map of step a;

f. setting the pixel intensity value in each of the three complementary color maps to the corresponding one of the intensity values of said three complementary color bytes or analog equivalents thereof if each of the examined intensity values in step b. of each of said three complementary color bytes or analog equivalents thereof are not within a selected tolerance of being equal to each other and storing same on a separate pixel map having coordinates corresponding to the same pixel location on the grey scale pixel map of step a; and g. repeating steps b. through f. for each pixel location in said image.

16. A method as in claim 15 wherein said storing is in an electronic memory.

17. A method as in claim 15 wherein said storing is directly on black and white film.

18. A method as in claim 17 wherein said storing is performed sequentially.

19. A method as in claim 15 further comprising the step of:

h. recording the pixel intensity value of the grey scale image map, and the pixel intensity value of each of the three complementary color maps from steps a. through f. for each pixel location in said image as five separate images on a single sheet of black and white film.

20. A method as in claim 15 further comprising the step of:

h. recording the pixel intensity value of the grey scale image map, the pixel intensity value of the black spot image map, and the pixel intensity value of each of the three complementary color maps from steps a. through f. for each pixel location in said image as five separate images on a single sheet of black and white film.

21. A method as in claim 19 wherein the color maps forming the three corresponding color images on the film are smaller in size than the grey scale map forming the gray scale image on the film.

22. A method as in claim 20 wherein the color maps forming the three corresponding color images on the film are smaller in size than the grey scale map forming the gray scale image on the film.

23. A method for selectively displaying one of (a) a full grey scale image, (b) an enhanced grey scale image, or (c) a reconstructed color image, which is displayed from five constituent image portions recorded on black and white film wherein one image portion corresponds to a full grey scale image, a black spot image with zero intensity pixels in those pixel locations where the composite image includes color information and maximum intensity pixels where the composite image does not include color information, and three image portions each corresponding to one of three complementary color images each with zero intensity pixels in those pixel locations where the black spot image includes maximum intensity pixels, said method comprising the steps of:

A. selecting for display one of said (a) full grey scale image, (b) said enhanced grey scale image, or (c) a reconstructed color image; and either B. when said full grey scale image is selected in step A., then:
  1. illuminating only said full grey scale image of the black and white film with a white light; and
  2. focusing the light passing through said grey scale image of said black and white film to a point to create said full grey scale image for viewing; or C. when said enhanced grey scale image is selected in step A., then:
  1. serially illuminating the said full grey scale image and the black spot image of the black and white film with white light; and
  2. focusing the light passing through said grey scale image and the black spot image of said black and white film to a point to create said enhanced grey scale image for viewing; or D. when a reconstructed color image is selected in step A., then:
  1. illuminating each of said three complementary color image portions of said black and white film with light having a color that corresponds to the color information of the corresponding one of the three complementary color images; and
  2. focusing the light passing through each of said three complementary color image portions of said black and white film to the same point to create a composite color image for viewing.

24. A method as in claim 23 wherein D. further comprises:

3. simultaneously with step D.1. illuminating said full grey scale image of the black and white film with a white light to create a projected grey scale image and focusing the light passing through said full grey scale image and each of said three color images to create a composite grey and color image for viewing.

25. A method as in claim 24 wherein D. further comprises:

4. illuminating the black spot image of the black and white film serially with the full grey scale image of the black and white film.

26. A method as in claim 23 wherein the light is focused on a viewing screen.

27. A method as in claim 24 wherein the light is focused on a viewing screen.

28. A method as in claim 25 wherein the light is focused on a viewing screen.

29. Apparatus for decomposing an image that has been color enhanced in selected regions with color added to depict a variable characteristic that is color independent so that changes in that characteristic can be determined, said image being presented electronically as three complementary color bytes or analog equivalents thereof for each pixel with the value encoded in each byte or analog equivalent thereof being the intensity of that complementary color at that pixel of the image, said decomposition being into four constituent maps including a grey scale original image map of the regions where no color has been added and three complementary color maps of the color enhanced regions of the image, said apparatus comprising:

means for examining the intensity values of each of said three complementary color bytes or analog equivalents thereof at the same pixel location of said image; and means for setting the pixel intensity value in the grey scale image map to the intensity value of a selected one of said three complementary color bytes or analog equivalents thereof and in each of the three complementary color maps to the zero intensity value if said examining means determines that each of the examined intensity values of each of said three complementary color bytes or analog equivalents thereof are within a selected tolerance of being equal to each other, and for setting the pixel intensity value in the grey scale image map to the zero intensity value and setting the pixel intensity value in each of the three complementary color maps to the corresponding one of the intensity values of said three complementary color bytes if said examining means determines that each of the examined intensity values of each of said three complementary color bytes are not within a selected tolerance of being equal to each other.

30. Apparatus as in claim 29 further includes means for recording the pixel intensity value of the grey scale image map and the pixel intensity value of each of the three complementary color maps from said setting means for each pixel location in said image as four separate images on a single sheet of black and white film.

31. Apparatus for reconstructing and displaying a color image from four constituent image portions recorded on black and white film wherein one image portion corresponds to an enhanced grey scale image having zero intensity pixels in those pixel locations where the composite image includes color information and three image portions each corresponding to one of three complementary color images each with zero intensity pixels in those pixel locations where the composite image is to be grey, said apparatus comprising:

means for illuminating said enhanced grey scale image portion of said black and white film with white light;

means for illuminating each of said three other image portions of said black and white film with light having a color that corresponds to the color information of the corresponding one of the three complementary color images; and means for focusing the light passing through each of said four constituent image portions of said black and white film to the same point on said viewing screen to create a composite grey and color image.

32. Apparatus as in claim 31 comprising a viewing screen on which the coinciding grey and color images are formed.

33. Apparatus for storing on black and white film the constituent parts of a composite color image that has been color enhanced in selected regions with color added to depict a variable characteristic that is color independent so that changes in that characteristic can be determined, said image being presented electronically as having a plurality of parts, the intensity of each pixel of each part represented electronically, said apparatus comprising:

means for converting the electrical intensity information of each pixel of said plurality of parts to a wavelength of light that is detectable by said black and white film; and means for exposing said black and white film to the light output signals from said converting means to record the pixel intensity value of each pixel of said plurality of parts for each pixel location in said composite image as a plurality of separate images on a single sheet of said black and white film.

34. Apparatus as in claim 33 wherein said exposing means includes means for recording said plurality of parts which include an enhanced grey scale part with black pixels in those pixel locations where the composite image includes color information and three complementary color parts each with black pixels in those pixel locations where the composite image is to be grey.

35. Apparatus as in claim 33 wherein said exposing means includes means for recording said plurality of parts which include a grey scale part with intensity information at each pixel location, a black spot part with black pixels in those pixel locations where the composite image includes color information and clear pixels where no color information is included in the composite image, and three complementary color parts each with black pixels in those pixel locations where the composite image is to be grey.

36. Apparatus as in claim 33 wherein said exposing means includes means for recording said plurality of parts which include a grey scale part with intensity information at each pixel location, and three complementary color parts each with black pixels in those pixel locations where the composite image is to be grey.

37. Apparatus as in claim 33 wherein said exposing means includes means for recording said plurality of parts which include an enhanced grey scale part with black pixels in those pixel locations where the composite image includes color information.

38. Apparatus for decomposing an image that has been color enhanced in selected regions with color added to depict a variable characteristic that is color independent so that changes in that characteristic can be determined, said image being presented electronically first as a collection of grey scale bytes with the value encoded in each byte or analog equivalent thereof being the intensity of the grey scale at the corresponding pixel of the image without color enhancement and second as a collection of three complementary color bytes or analog equivalents thereof for each pixel with the value encoded in each byte or analog equivalent thereof being the intensity of the corresponding color at that pixel of the image, said decomposition being into five constituent maps including a grey scale original image map, a black spot image map, and three complementary color maps of the color enhanced regions of the image, said apparatus comprising:

means for selecting between said grey scale bytes or analog equivalents thereof and said three complementary color bytes or analog equivalents thereof;

means for storing said grey scale bytes or analog equivalents thereof for the complete grey scale image in a pixel map when the grey scale bytes or analog equivalents thereof are selected by said selecting means;

means for examining the intensity values of each of said three complementary color bytes or analog equivalents thereof at the same pixel location of said image when said three complementary color bytes or analog equivalents thereof are selected by said selecting means;

means for setting the pixel intensity value in the black spot image map to the maximum intensity value and in each of the three complementary color maps to the zero intensity value if said examining means determines that each of the examined intensity values of said three complementary color bytes or analog equivalents thereof are within a selected tolerance of being equal to each other, and for setting the pixel intensity value in the black spot image map to the zero intensity value and in each of the three complementary color maps to the corresponding one of the intensity values of said three complementary color bytes or analog equivalents thereof if said examining means determines that each of the examined intensity values of said three complementary color bytes or analog equivalents thereof are not within a selected tolerance of being equal to each other; and means for reading pixel values from the grey scale pixel map in said storing means that correspond to the pixel location in the composite image being determined in said setting means.

39. Apparatus as in claim 38 further includes means for recording the pixel intensity value of the full grey scale image map from said reading means, and the pixel intensity value of the black spot image map and each of the three complementary color maps from said setting means for each pixel location in said image as five separate images on a single sheet of black and white film.

40. Apparatus for selectively and alternatively displaying two or more of a full grey scale image without color enhancement, an enhanced grey scale image without color enhancement, a color only image, or a reconstructed color image from five constituent image portions recorded on black and white film wherein one image portion corresponds to a full grey scale image without color enhancement, one image portion corresponds to a black spot image with zero intensity pixels in those pixel locations where the composite image includes color information and maximum intensity pixels where the composite image does not include color information, and three image portions each corresponding to one of three complementary color images each with zero intensity pixels in those pixel locations where the black spot image includes maximum intensity pixels, said apparatus comprising:

means for selecting for display one of said full grey scale image without color enhancement, an enhanced grey scale image, a color only image or a reconstructed color image from said five constituent image portions;

first means for illuminating only said full grey scale image with a white light;

means for focusing the light from said first illuminating means passing through said grey scale image of said black and white film to a point to form an image for viewing;

second means for illuminating said full grey scale and said black spot images serially with a white light and means for focusing same to create a projected enhanced grey scale image for viewing with black spots where color is to be displayed in the composite image;

third means for illuminating each of said three complementary color image portions of said black and white film with light having a color that corresponds to the color information of the corresponding one of the three complementary color images;

means for focusing the light from said first illuminating means passing through the full grey scale image and the filtered light from said third illuminating means passing through each of said three complementary color image portions of said black and white film from said third illuminating means to the same point on a viewing screen to create a composite grey and color image for viewing; and means for focusing the light from said second illuminating means passing through the additive combination of said full grey scale image and said black spot images and the filtered light from said third illuminating means passing through each of said three complementary color image portions of said black and white film from said third illuminating means to the same point on a viewing screen to create a composite grey and color image for viewing.

41. A method for selectively displaying one of (a) an enhanced grey scale image, or (b) a reconstructed color image, which is displayed from four constituent image portions recorded on black and white film wherein one image portion corresponds to an enhanced grey scale image, and three image portions each corresponding to one of three complementary color images each with zero intensity pixels in those pixel locations where the reconstructed color image is to be a shade of grey, said method comprising the steps of:

A. selecting for display one of said (a) said enhanced grey scale image, or (b) a reconstructed color image; and either B. when said enhanced grey scale image is selected in step A., then:
1. illuminating the said enhanced grey scale image of the black and white film with white light; and
2. focusing the light passing through said said enhanced grey scale image of said black and white film to a point to create said enhanced grey scale image for viewing; or C. when a reconstructed color image is selected in step A., then:
1. illuminating said enhanced grey scale image of the black and white film with a white light to create a projected enhanced grey scale image;
2. simultaneously with step C.1. illuminating each of said three complementary color image portions of said black and white film with light having a color that corresponds to the color information of the corresponding one of the three complementary color images; and
3. focusing the light passing through said enhanced grey scale image and each of said three complementary color image portions of said black and white film to the same point to create a composite grey and color image for viewing.

42. A method as in claim 41 wherein the light is focused on a viewing screen.

* * * * *